UNITED STATES PATENT OFFICE.

MATABEI SHINOZAKI, OF NIHOMBASHI-KU, TOKYO, JAPAN.

WRITING-INK.

1,282,302.  
No Drawing.

Specification of Letters Patent. Patented Oct. 22, 1918.

Application filed June 5, 1917. Serial No. 172,946.

*To all whom it may concern:*

Be it known that I, MATABEI SHINOZAKI, a subject of the Emperor of Japan, residing at No. 2, Bakurocho-Nichome, Nihombashi-ku, Tokyo, Japan, have invented certain new and useful Improvements in Writing-Inks, of which the following is a specification.

My invention relates to improvements in writing inks, wherein a certain carbonaceous substance indifferent to the action of other chemicals is mixed in a solution of caustic alkali, whereby a stock solution for ink is prepared, and a proper quantity of this solution is put in an alkaline solution in which coloring matter and soap are dissolved. The object of my invention is to obtain such a black ink as will remain indelible in spite of the action of erasing agents, and also does not corrode steel pens, and in case a drop of water falls on the paper, does not make the writing spread, and is elegant in its color too.

Writing inks in common use, as they cannot stand the action of erasing agents, are liable to tricks and render written documents often uncertain.

In my process, a suitable quantity of caustic alkali is first dissolved in water, and an alkaline solution is thus prepared. In a proper quantity of this solution is dissolved a coloring matter soluble in alkali, such as "indulin water soluble," and next in a part of said alkaline solution is put a proper quantity of lamp-black, which is mixed therein paste-like, and after kneading up by a roll, it is added to the aforesaid solution of coloring matter. Further, to make it water-proof is added thereto, with agitation, a little soft soap, and the density of the mixture may be modified by the alkaline stock solution, and finally it is heated to produce a perfect mixture.

To mention the process in detail:—6 grams of caustic soda are dissolved in 2.4 gallons of water. In 2 gallons of this solution, 90 grams of indulin water soluble are dissolved, and in one part of the original solution are put 135 grams of lamp-black. Further, by the addition of 15 grams of soft soap thereto, the mixture is made paste-like, and being fully kneaded by a roll, it is added to the aforesaid indulin solution, and then is agitated while being heated.

Lamp black, when put in water and left alone, therein precipitates. This is a well known fact. Through a special investigation on this point, I have found that, when lamp black is treated in an alkaline solution, both easily become closely mixed, and that, in the mixture, the lamp black is held in suspension in a state of fine division. There is no fear of its causing precipitation. But a fluid which consists of lamp-black and alkali is not satisfactory in its color, so that such fluid is not excellent as an ink; on that account indulin soluble in alkali is added thereto to make the color brilliant. For this purpose, indulin is not the sole tinctorial agent. A black or gray one, if soluble in alkali, may be also used.

Common writing inks are in most cases iron-gall inks of which the coloring matter is anilin. The fluid, in this case, cannot stand the action of erasing agents, and does not only fade in color in the course of years, but being of acid, the paper is no doubt injured. On this account, it is generally acknowledged that the same is unfit for the writing of those documents which are to be kept permanently. It is not too much to say that the fluid according to my invention is free from these drawbacks, and besides is of an elegant black.

Having described my invention, what I claim and desire to secure by Letters Patent is:—

As an article of manufacture a writing fluid composed of a carbonaceous substance dissolved in a solution of caustic alkali, a dyestuff, such as indulin, dissolved therein, lamp-black and soft soap, substantially as described.

In testimony whereof I affix my signature in presence of two witnesses.

MATABEI SHINOZAKI.

Witnesses:
HARUHIKO JIDA,
H. F. HAWLEY.

Copies of this patent may be obtained for five cents each, by addressing the "Commissioner of Patents, Washington, D. C."